No. 741,436. PATENTED OCT. 13, 1903.
L. ATWOOD.
PROCESS OF DRYING BREWERS' GRAIN.
APPLICATION FILED JAN. 17, 1901.
NO MODEL.
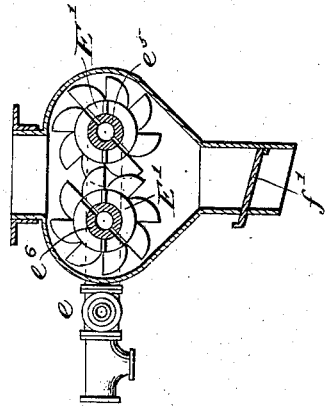
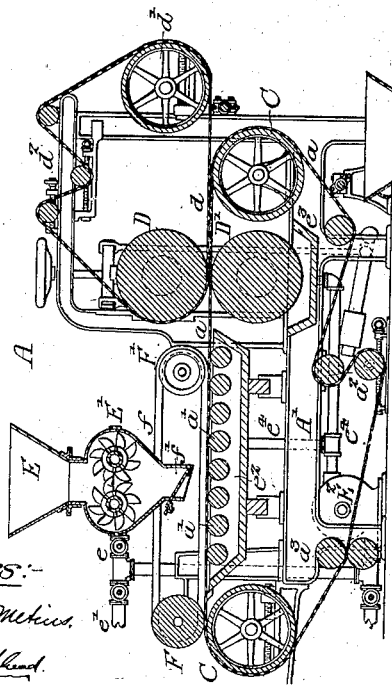
Witnesses:—
Inventor:—
Leonard Atwood
by his Attorneys No. 741,436. Patented October 13, 1903.

UNITED STATES PATENT OFFICE.

LEONARD ATWOOD, OF PHILADELPHIA, PENNSYLVANIA.

PROCESS OF DRYING BREWERS' GRAIN.

SPECIFICATION forming part of Letters Patent No. 741,436, dated October 13, 1903.

Application filed January 17, 1901. Serial No. 43,658. (No model.)

*To all whom it may concern:*

Be it known that I, LEONARD ATWOOD, a citizen of the United States, residing in Philadelphia, Pennsylvania, have invented certain Improvements in Processes of Drying Brewers' Grain, &c., of which the following is a specification.

My invention consists of a process of drying brewers' grains or other granular or powdered materials of which it is desired to retain certain properties after the material is dried.

My invention is especially applicable for drying brewers' grains; and the main object of my invention is to thoroughly and evenly dry the grains so as to retain therein a large percentage of the gluten and other valuable food constituents. This object I attain in the following manner, reference being had to the accompanying drawings, in which—

Figure 1 represents a longitudinal sectional view of one form of apparatus for carrying my process into effect, and Fig. 2 is an enlarged sectional view of the feeding mechanism.

The apparatus in the present instance is made in two sections, one the draining-section A and the other the drying-section B, the drying-section receiving material directly from the draining-section after it has been drained therein. An endless perforated belt $a$ is supported by suitable carrying-rolls $a'$, mounted on the frame $A'$ of the machine, and by breast-rolls C C, the return-run of the belt passing around tension-rolls $a^2$ and through squeeze-rolls $a^3$. An endless belt $d$ is mounted above a portion of the carrying-run of the belt $a$, this belt passing around the upper press-roll D, a guide-roll $d'$, and tension-rolls $d^2$. Directly under the upper press-roll D is the lower press-roll D', mounted under the carrying-run of the belt $a$. The belt $d$ extends beyond the belt $a$, so as to allow the material to discharge into the hopper $b$ of the drying-section B. E is the feed-hopper, having toothed feed-wheels E', which in the present instance are carried on hollow perforated shafts $e^5$ and $e^6$, connected to a pipe $e$, as indicated in Fig. 2, this pipe being in communication with a water-supply pipe $e'$ and to a pump $E^2$, the pump in turn being connected to the drip-troughs $e^2$ $e^3$ by pipes $e^4$, and said drip-troughs $e^2$ being under the carrying-rolls $a'$ and the troughs $e^3$ under the press-roll D'. Deckle-straps $f$ are carried by wheels F F', the wheel F at the rear of the machine being in the form of a roll and preventing the material from flowing back over the breast-roll, while the deckle-straps prevent the material escaping at the sides of the belt. Means are provided for adjusting the squeeze-rolls D D', and a valve $f'$ is provided at the end of the feed-hopper for regulating the amount of material fed to the belt. The construction of this machine is fully described and claimed in the application filed by me bearing Serial No. 38,906 of 1900.

The feed-hopper is charged with damp grains, which are fed to the drainage-belt $a$, and liquid is added to the grains, in the present instance through the hollow shafts of the feed-wheels E', although the liquid may be admitted through a pipe at the lower end of the hopper, if desired, so long as sufficient liquid is added to the grains to cause them to flow evenly over the surface of the drainage-belt. As the grains are carried forward by the belt $a$ the free liquor escapes through the belt into the receiver underneath, and the grains then pass between the squeeze-rolls D D', being held to the belt $a$ by the belt $d$. The squeeze-rolls can be adjusted so that a proper proportion of liquid will be removed from the grain, which is then discharged over the end of the belt $a$ into the hopper $b$ of the drying-section, any grains remaining on either belt being removed by suitable cleansing-blades coming in contact with the surface of the belt. By this method the mass of grains as it leaves the belt is evenly moist throughout, so that when the process of drying is completed one quantity of material will not be drier than another, and consequently the grains will not be delivered from the drying-section with some portions damp and other portions scorched, as by the present methods of drying; but the entire mass will be uniformly dried and a large percentage of gluten and other valuable food constituents will be retained therein. I prefer to utilize over and over again the liquid that is removed from the grains to moisten the incoming grains, and this I do by connecting the pump E² to the drip-catches and to the hollow shafts of the feed-wheels E', as shown.

The drying-section B consists of a jacketed casing B', having a water-inlet pipe b', communicating with the jacket, and the outlet-pipe b², also communicating with the jacket, so that water can circulate through the jacket and keep the casing cool, thereby securing a vacuum in the same, while maintaining a low temperature. Within the casing is a series of drying-drums G, arranged in the manner shown, and passing around these drums are carrying-belts g g', the return-runs of these belts passing around guide-rolls and tension-rolls.

The material passes from the hopper b', after it leaves the draining-section of the machine, into a pocketed drum H, forming a trap feeding device, and passes thence down a channel h' between feed-rolls h² onto the belt g, which is supported in the present instance by a perforated table g². Directly under this table and under the first drying-drums is a pan or receiver g³ for carrying off any liquid which may be expressed from the material. The material is carried by the belts g g' around the several drying-drums, steam being admitted to the drums in order to heat them to the proper degree, and the material is discharged at the opposite end of the machine into a hopper i, below which is a discharge-valve i' in the form of a pocketed drum.

It will be understood that any form of trap feeding and discharge mechanism may be used.

A partial vacuum is maintained in the chamber formed within the casing B' by withdrawing air or vapor through a pipe k by means of an injector, air-pump, or other form of exhausting apparatus K, the feeding of the grains into the chamber and the discharge therefrom being effected by means of devices which at the same time constitute traps for preventing the inflow of air at either the inlet or outlet.

The grains are received from the drainage-section in a uniformly damp condition, and by passing them through the drying-chamber under a partial vacuum the grains are thoroughly and evenly dried and the gluten and other valuable food constituents are retained in the grains.

The construction of the above-described drying-section is fully set forth and claimed in an application filed by me bearing Serial No. 11,200 of 1900.

I claim as my invention—

The process herein described of drying brewers' grains, the same consisting in uniformly distributing a body of said grains over a surface by adding liquid to the same so as to cause them to flow, treating said mixture so that free liquid may escape, removing a further amount of liquid from the mass by pressing the same, breaking up the mass of still damp grain, delivering the same on a conveyer in a relatively thin layer, and exposing said layer to the action of a drier, substantially as described.

In testimony whereof I have signed my name to this specification in the presence of two subscribing witnesses.

LEONARD ATWOOD.

Witnesses:
WILL. A. BARR,
JOS. H. KLEIN.